US008867832B2

(12) United States Patent
Hsia et al.

(10) Patent No.: US 8,867,832 B2
(45) Date of Patent: Oct. 21, 2014

(54) METHOD FOR DETECTING AND REMOVING SCROLLING TEXTS DURING VIDEO COMMUNICATION

(71) Applicants: Shih-Chang Hsia, Yunlin (TW); Chien-Hung Liu, Yunlin (TW)

(72) Inventors: Shih-Chang Hsia, Yunlin (TW); Chien-Hung Liu, Yunlin (TW)

(73) Assignee: National Yunlin University of Science and Technology, Yunlin (TW)

( * ) Notice: Subject to any disclaimer, the term of this patent is extended or adjusted under 35 U.S.C. 154(b) by 84 days.

(21) Appl. No.: 13/756,874

(22) Filed: Feb. 1, 2013

(65) Prior Publication Data

US 2014/0219555 A1    Aug. 7, 2014

(51) Int. Cl.
*G06K 9/00*  (2006.01)
*G06K 9/34*  (2006.01)
*G06K 9/40*  (2006.01)
*G06K 9/32*  (2006.01)
*H04N 11/02* (2006.01)
*G06T 7/00*  (2006.01)

(52) U.S. Cl.
CPC ................ *G06T 7/0079* (2013.01)
USPC ....... 382/164; 382/264; 382/300; 375/240.01

(58) Field of Classification Search
CPC ................................................ G06K 9/3266
See application file for complete search history.

(56) References Cited

U.S. PATENT DOCUMENTS

| | | | |
|---|---|---|---|
| 6,219,157 B1 * | 4/2001 | Shikakura et al. | 358/426.04 |
| 6,608,930 B1 * | 8/2003 | Agnihotri et al. | 382/176 |
| 6,819,359 B1 * | 11/2004 | Oda | 348/247 |
| 7,590,301 B2 * | 9/2009 | Wu | 382/262 |
| 7,796,169 B2 * | 9/2010 | Kitani | 348/247 |
| 7,916,192 B2 * | 3/2011 | Ting | 348/247 |
| 8,411,738 B2 * | 4/2013 | Zhou et al. | 375/240.01 |
| 8,503,782 B2 * | 8/2013 | Vincent et al. | 382/177 |
| 2010/0232713 A1 * | 9/2010 | Zhou et al. | 382/209 |

* cited by examiner

*Primary Examiner* — Andrae S Allison
(74) *Attorney, Agent, or Firm* — Che-Yang Chen; Law Office of Michael Chen

(57) ABSTRACT

A method for detecting and removing scrolling texts comprising a step of using an adaptive transient difference processing of video communication to conduct frame calculation, wherein the adaptive transient difference processing takes first N frames $f_{jk}^{t-N}$ and a current frame $f_{jk}^{t}$, and subtracts them to obtain a frame difference; and if the frame difference is greater than a threshold value, it is determined that the current frame $f_{jk}^{t}$ has scrolling texts; and interpolates the first N frames before the current position of the scrolling texts to replace the current frame $f_{jk}^{t}$ to achieve the goal of hiding the scrolling texts during video communication to enhance the viewing effect.

11 Claims, 5 Drawing Sheets

METHOD FOR DETECTING AND REMOVING SCROLLING TEXTS DURING VIDEO COMMUNICATION

FIELD OF THE INVENTION

The present invention relates to a video screen optimization method, and more particularly to a method for detecting and removing scrolling texts during video communication.

BACKGROUND OF THE INVENTION

With the rapid development of video and network technologies, there are a lot of applications related to video communication in our lives recently, such as video conferencing, internet video courses, internet TV and digital TV. Video images usually include a main screen, background and texts to provide information for audiences. In order to emphasize certain information or provide certain advertisements, scrolling texts will be inserted at the periphery of the video screen, so that the audience can see the information in addition to the video programs. However, many audiences would be distracted because of the scrolling texts and cannot focus on the program. If the audience can choose whether he/she wants to see the scrolling texts and effectively hide the scrolling texts, the viewing effects can be significantly enhanced. This is actually the technical problem the present invention wants to solve.

SUMMARY OF THE INVENTION

The technical problem the present invention wants to solve is described above and the present invention provides a method for detecting and removing scrolling texts during video communication.

The present invention provides an adaptive transient difference processing method of the video communication, especially the calculation of the video frame. The video communication signal is converted from color to grayscale signal, and the noise of the video is reduced through the low-pass filter to smooth the video images and further the accuracy of the adaptive transient difference processing. Using the adaptive transient difference processing (10) to take first N frames $f_{jk}^{t-N}$ and a current frame $f_{jk}^{t}$, and subtract them to obtain a frame difference $Diff_{jk}=|f_{jk}^{t}-f_{jk}^{t-N}|$. If the frame difference $Diff_{jk}$ is greater than a threshold value, it is determined that the current frame $f_{jk}^{t}$ has scrolling texts. On the contrary, if no scrolling texts found and the threshold value to detect scrolling texts is the localized difference average of the size of an L×K window, the localized difference can be obtained as $$LM_{ij} = \frac{\sum_{i=-K}^{K}\sum_{j=-L}^{L} Diff_{i+K,j+L}}{K \times L}$$

to compare with the threshold value. The greater the localized difference $LM_{ij}$, the smaller the threshold value of scrolling text detection. When the frame difference $Diff_{jk}$ of a frame of one unit point is greater than the threshold value, the unit point is a scrolling text point. In one embodiment, the present invention uses the adaptive transient difference processing to detect scrolling texts during video communication and interpolating the first N frames before the current position of the scrolling texts to replace the current frame $f_{jk}^{t}$ to achieve the goal of hiding the scrolling texts during video communication to enhance the viewing effect.

In another embodiment, the adaptive transient difference processing uses adaptive transient difference calculation method, wherein if the first N frame $f_{jk}^{t}$'s average frame difference $ADiff_{jk}$ is smaller than the threshold value, a further calculation of the first N+1 frames is conducted until the average frame difference $ADiff_{jk}$ is greater than the threshold value. Taking the position of the first N frames $f_{jk}^{t-N}$ that is greater than the threshold value as the next calculation value of the difference between the current frame $f_{jk}^{t}$ and the frame difference $Diff_{jk}$.

The main object of the present invention is that the calculation takes the first N frames $f_{jk}^{t-N}$ and compares with the current frame $f_{jk}^{t}$ to obtain the frame difference $Diff_{jk}$, and if the frame difference $Diff_{jk}$ is greater than the threshold value, it is determined that the current frame $f_{jk}^{t}$ has scrolling texts. The current frame $f_{jk}^{t}$ can be replaced by interpolation with the first N frames $f_{jk}^{t-N}$ at the same position of the scrolling texts to hide the scrolling texts and enhance the viewing effect.

The secondary object of the present invention is that the frame difference $Diff_{jk}$ calculated by the adaptive transient difference processing is 30% of the periphery area of video communication screen. The average frame difference $ADiff_{jk}$ is obtained by accumulating the frame difference $Diff_{jk}$, and if the average frame difference $ADiff_{jk}$ is greater than the threshold value, it is determined that the periphery area of video communication screen has scrolling texts, so as to increase the accuracy of detecting the scrolling texts and decrease the calculation difficulty.

Another object of the present invention is that when hiding the scrolling texts, the calculation can be expanded N×N around the periphery of the texts, so that the cross edge of every point of the scrolling is considered an area to be hidden to select the peripheral area of the entire scrolling texts to completely hide the scrolling texts, and further eliminate the background that resembles the scrolling texts to enhance the hiding effect.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
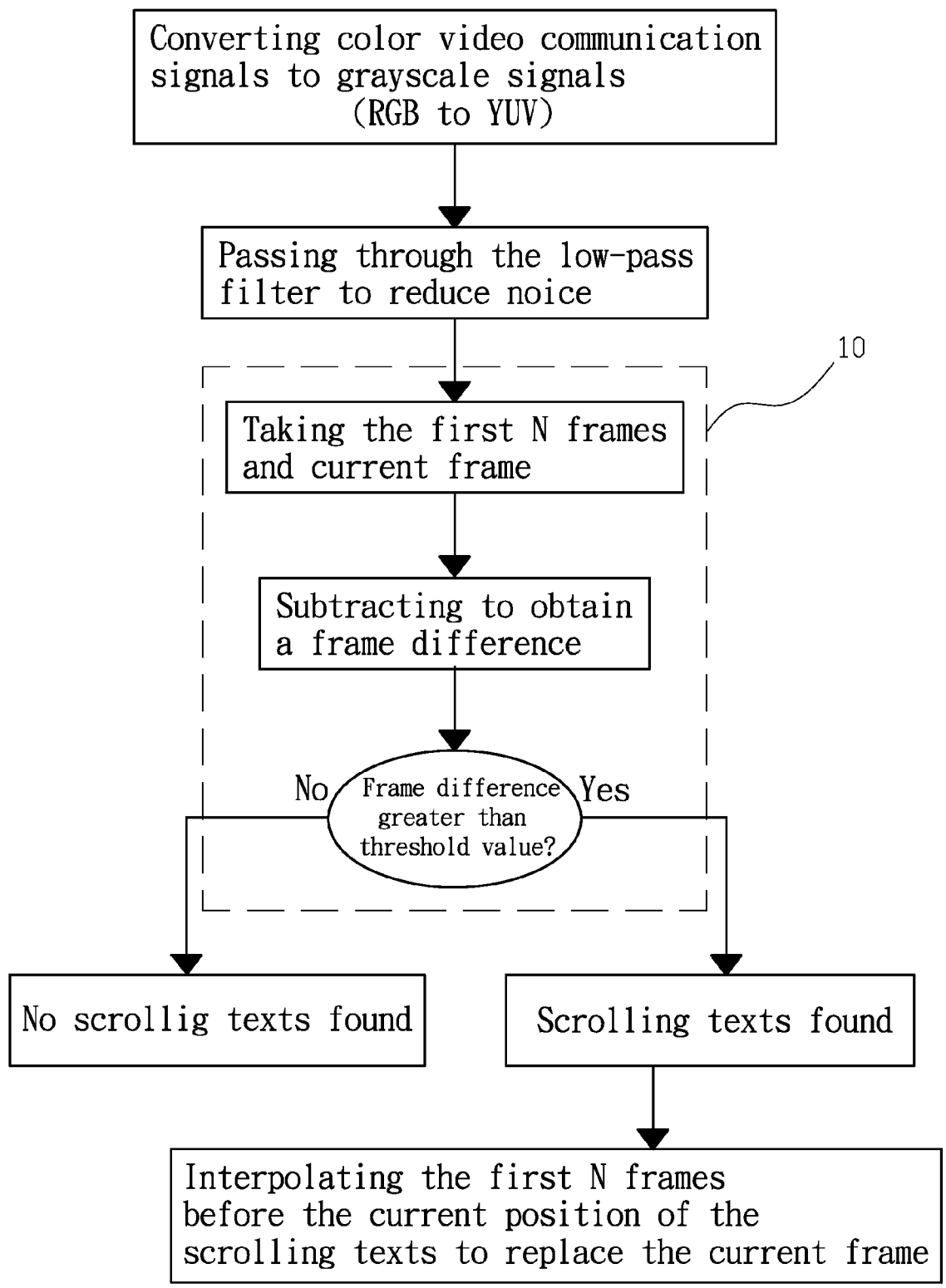
FIG. 1 illustrates a flow diagram of the method for detecting and removing scrolling texts in the present invention.

In order to further understand the goal, characteristics and effect of the present invention, a number of embodiments along with the drawings are illustrated as following:

Referring to FIG. 1, a method for detecting and removing scrolling text during video communication is disclosed. The present invention is based on an adaptive transient difference processing (10) of the video communication, especially the calculation of the video frame. The video communication signal is converted from color to grayscale signal, and the noise of the video is reduced through the low-pass filter to smooth the video images and further the accuracy of the adaptive transient difference processing (10). Using the adaptive transient difference processing (10) to take first N frames $f_{jk}^{t-N}$ and a current frame $f_{jk}^{t}$, and subtract them to obtain a frame difference $Diff_{jk}=|f_{jk}^{t}-f_{jk}^{t-N}|$. If the frame difference $Diff_{jk}$ is greater than a threshold value, it is determined that the current frame $f_{jk}^{t}$ has scrolling texts. On the contrary, if no scrolling texts found and the threshold value to detect scrolling texts is the localized difference average of the size of an L×K window, the localized difference can be obtained as $$LM_{ij} = \frac{\sum_{i=-K}^{K}\sum_{j=-L}^{L} Diff_{i+K, j+L}}{K \times L}$$

to compare with the threshold value. The greater the localized difference $LM_{ij}$, the smaller the threshold value of scrolling text detection. When the frame difference $Diff_{jk}$ of a frame of one unit point is greater than the threshold value, the unit point is a scrolling text point. The threshold can also be a fixed point which can be manually set. In summary, using the adaptive transient difference processing (10) to detect scrolling texts during video communication and interpolating the first N frames before the current position of the scrolling texts to replace the current frame $f_{jk}^{t}$ to achieve the goal of hiding the scrolling texts during video communication to enhance the viewing effect.

Figure 2:
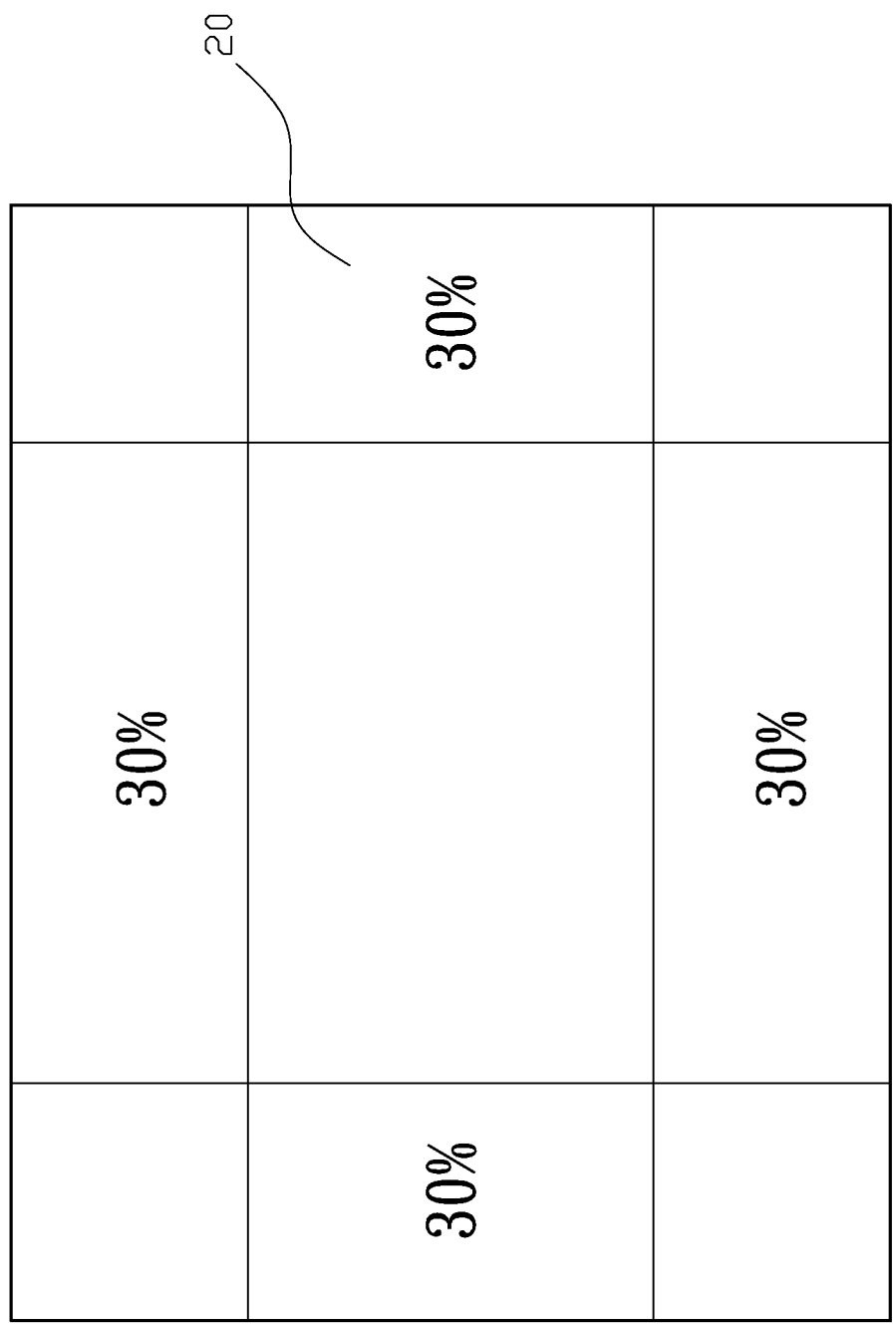
FIG. 2 illustrates a schematic view of detecting the periphery of video communication in the present invention.

Referring again to FIGS. 1 and 2, the method for detecting scrolling text during video communication is further illustrated. Since the scrolling texts appear more on the periphery of the video communication screen, the frame difference $Diff_{jk}$ of using the adaptive transient difference processing (10) is to detect 30% of the area of the periphery of the video communication screen (20) and accumulate the average frame difference $Diff_{jk}$ to obtain an average frame difference $$ADiff_{jk} = \frac{\sum_{j=0}^{N}\sum_{k=0}^{M} Diff_{jk}}{N \times M}.$$

Figure 3:
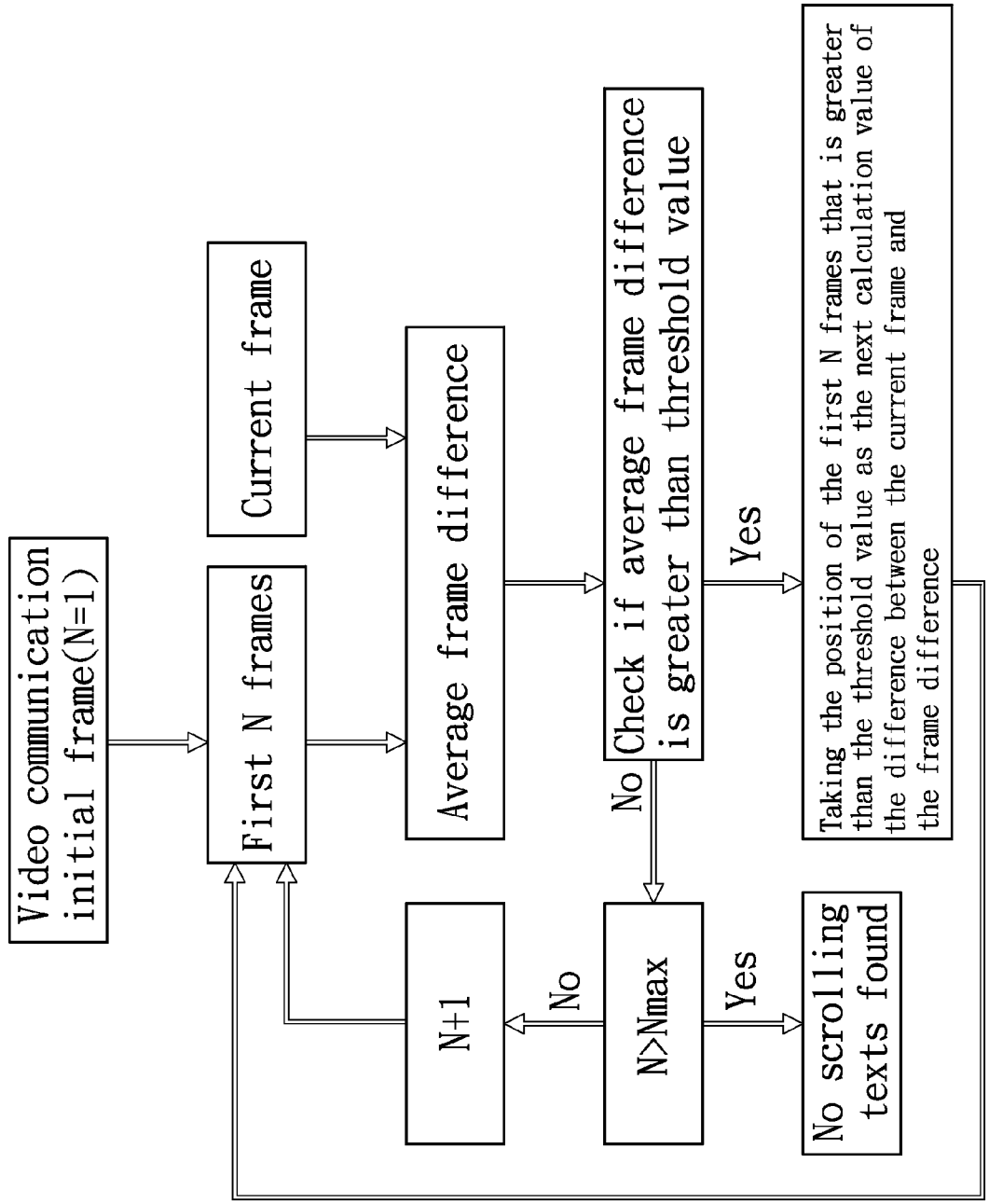
FIG. 3 illustrates a flow diagram of the adaptive transient difference processing method in the present invention.

If the average frame difference $ADiff_{jk}$ is greater than the threshold value, it is determined that the periphery area of video communication screen (20) has scrolling texts, so as to enhance the accuracy of detecting the scrolling texts and decrease the calculation difficulty. Furthermore, the adaptive transient difference processing (10) uses adaptive transient difference calculation as shown in FIG. 3, wherein the calculation uses the initial frame (N=1) of video communication as the first N frames $f_{jk}^{t-N}$, and obtains the average frame difference $ADiff_{jk}$ using the first N frames $f_{jk}^{t-N}$ and the current frame $f_{jk}^{t}$, then checking if the average frame difference $ADiff_{jk}$ is greater than the threshold value. When the average frame difference $ADiff_{jk}$ obtained from the first N frames $f_{jk}^{t-N}$ is smaller than the threshold value, a further calculation of the first N+1 frames is conducted until the average frame difference $ADiff_{jk}$ is greater than the threshold value. Taking the position of the first N frames $f_{jk}^{t-N}$ that is greater than the threshold value as the next calculation value of the difference between the current frame $f_{jk}^{t}$ and the frame difference $Diff_{jk}$, and when N of the $N^{th}$ frame $f_{jk}^{t-N}$ is the maximum, it is determined that there is no scrolling text.

Figure 4:
FIG. 4 illustrates a schematic view of expanding area of scrolling texts in the present invention.
Figure 5:
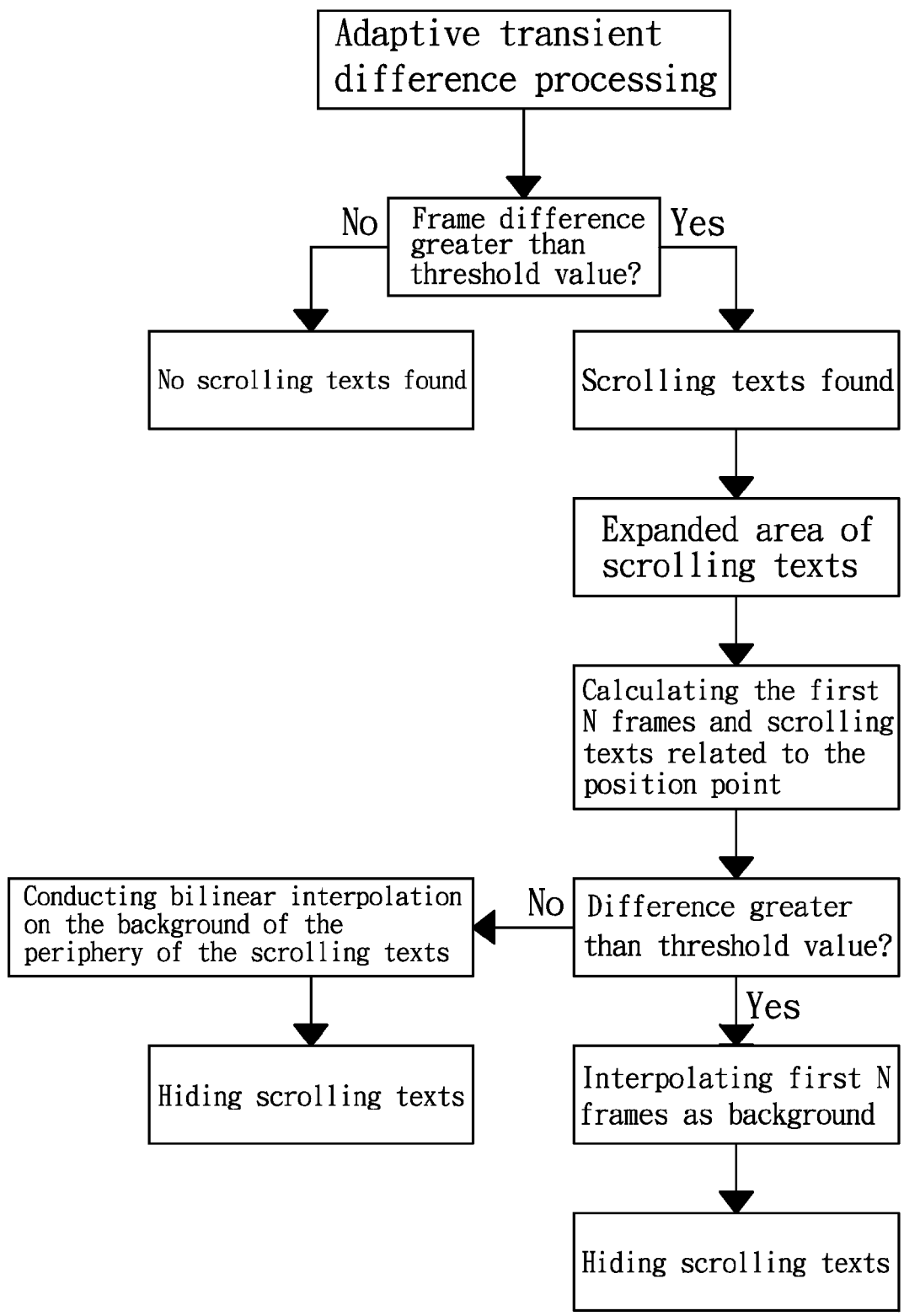
FIG. 5 illustrates a flow diagram of removing scrolling texts in the present invention.

Referring again to FIG. 1, the method for detecting hidden scrolling text during video communication is further illustrated. The video communication can be converted from color signals to grayscale signals to reduce calculation complexity of the adaptive transient difference processing and increase the accuracy of determining scrolling texts. Referring to FIG. 4, when the scrolling texts are hidden, an N×N expanded calculation is conducted at the periphery of the texts, so that the cross edge of every point of the scrolling is considered an area to be hidden to select the peripheral area of the entire scrolling texts to completely hide the scrolling texts, and further eliminate the background that resembles the scrolling texts. Referring to FIG. 5, the method of hiding scrolling text during video communication can be conducted in either color or grayscale mode. The grayscale mode is to calculate the grayscale value of the relative position point of the first N frames $f_{jk}^{t-N}$ and the grayscale value of the scrolling texts of the current frame $f_{jk}^{t}$, and if the difference of the two grayscale values is greater than the threshold value, the first N frames $f_{jk}^{t-N}$ is interpolated as background to hide the scrolling texts. The color mode is to calculate the RGB value of the relative position point of the first N frames $f_{jk}^{t-N}$ and the RGB value of the scrolling texts of the current frame $f_{jk}^{t}$, and if the difference of the two RGB values is greater than the threshold value, the first N frames $f_{jk}^{t-N}$ is interpolated as background to hide the scrolling texts. If the calculation of the RGB value of the relative position point of the first N frames $f_{jk}^{t-N}$ is not yet greater than the threshold value, using the current frame $f_{jk}^{t}$ to conduct bilinear interpolation on the background of the periphery of the scrolling texts to hide the scrolling texts.

According to the embodiments described above, the present invention has the following advantages: (1) the calculation takes the first N frames $f_{jk}^{t-N}$ and compares with the current frame $f_{jk}^{t}$ to obtain the frame difference $Diff_{jk}$, and if the frame difference $Diff_{jk}$ is greater than the threshold value, it is determined that the current frame $f_{jk}^{t}$ has scrolling texts. The current frame $f_{jk}^{t}$ can be replaced by interpolation with the first N frames $f_{jk}^{t-N}$ at the same position of the scrolling texts to hide the scrolling texts and enhance the viewing effect; (2) the frame difference $\text{Diff}_{jk}$ calculated by the adaptive transient difference processing (10) is 30% of the periphery area of video communication screen (20). The average frame difference $\text{ADiff}_{jk}$ is obtained by accumulating the frame difference $\text{Diff}_{jk}$, and if the average frame difference $\text{ADiff}_{jk}$ is greater than the threshold value, it is determined that the periphery area of video communication screen (20) has scrolling texts, so as to increase the accuracy of detecting the scrolling texts and decrease the calculation difficulty; and (3) when hiding the scrolling texts, the calculation can be expanded N×N around the periphery of the texts, so that the cross edge of every point of the scrolling is considered an area to be hidden to select the peripheral area of the entire scrolling texts to completely hide the scrolling texts, and further eliminate the background that resembles the scrolling texts to enhance the hiding effect.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A method for detecting and removing scrolling texts comprising a step of using an adaptive transient difference processing of video communication to conduct frame calculation, wherein the adaptive transient difference processing takes first N frames $f_{jk}^{t-N}$ and a current frame $f_{jk}^{t}$, and subtracts them to obtain a frame difference $\text{Diff}_{jk}=|f_{jk}^{t}-f_{jk}^{t-N}|$; and if the frame difference $\text{Diff}_{jk}$ is greater than a threshold value, it is determined that the current frame $f_{jk}^{t}$ has scrolling texts; and interpolates the first N frames before the current position of the scrolling texts to replace the current frame $f_{jk}^{t}$ to achieve the goal of hiding the scrolling texts during video communication to enhance the viewing effect.

2. The method for detecting and removing scrolling texts of claim 1, wherein the frame difference $\text{Diff}_{jk}$ of using the adaptive transient difference processing is to detect 30% of the area of the periphery of a video communication screen and accumulate the average frame difference $\text{Diff}_{jk}$ to obtain an average frame difference $$\text{ADiff}_{jk} = \frac{\sum_{j=0}^{N}\sum_{k=0}^{M} \text{Diff}_{jk}}{N \times M},$$

and if the average frame difference $\text{ADiff}_{jk}$ is greater than the threshold value, it is determined that the periphery area of video communication screen has scrolling texts.

3. The method for detecting and removing scrolling texts of claim 2, wherein the adaptive transient difference processing uses an adaptive transient difference calculation method, and if the first N frame $f_{jk}^{t}$'s average frame difference $\text{ADiff}_{jk}$ is smaller than the threshold value, a further calculation of the first N+1 frames is conducted until the average frame difference $\text{ADiff}_{jk}$ is greater than the threshold value, and the position of the first N frames $f_{jk}^{t-N}$ that is greater than the threshold value is taken as the next calculation value of the difference between the current frame $f_{jk}^{t}$ and the frame difference $\text{Diff}_{jk}$.

4. The method for detecting and removing scrolling texts of claim 1, wherein the threshold value to detect scrolling texts is a localized difference average of the size of an L×K window, the localized difference is obtained as $$LM_{ij} = \frac{\sum_{i=-K}^{K}\sum_{j=-L}^{L} \text{Diff}_{i+K,j+L}}{K \times L}$$

to compare with the threshold value; and the greater the localized difference $LM_{ij}$, the smaller the threshold value of scrolling text detection, and when the frame difference $\text{Diff}_{jk}$ of a frame of one unit point is greater than the threshold value, the unit point is a scrolling text point.

5. The method for detecting and removing scrolling texts of claim 1, wherein noise of the video communication is reduced through the low-pass filter to smooth the video images and further the accuracy of the adaptive transient difference processing.

6. The method for detecting and removing scrolling texts of claim 1, wherein an N×N expanded calculation is conducted at the periphery of the texts, so that the cross edge of every point of the scrolling is considered an area to be hidden to select the peripheral area of the entire scrolling texts to completely hide the scrolling texts.

7. The method for detecting and removing scrolling texts of claim 1, wherein the video communication is converted from color signals to grayscale signals to reduce calculation complexity of the adaptive transient difference processing and increase the accuracy of determining scrolling texts.

8. The method for detecting and removing scrolling texts of claim 7, wherein a grayscale mode is to calculate a grayscale value of the relative position point of the first N frames $f_{jk}^{t-N}$ and another grayscale value of the scrolling texts of the current frame $f_{jk}^{t}$, and if the difference of the two grayscale values is greater than the threshold value, the first N frames $f_{jk}^{t-N}$ is interpolated as background to hide the scrolling texts.

9. The method for detecting and removing scrolling texts of claim 8, wherein if the calculation of the grayscale value of the relative position point of the first N frames $f_{jk}^{t-N}$ is not yet greater than the threshold value, using the current frame $f_{jk}^{t}$ to conduct bilinear interpolation on the background of the periphery of the scrolling texts to hide the scrolling texts.

10. The method for detecting and removing scrolling texts of claim 1, wherein a color mode is to calculate a RGB value of the relative position point of the first N frames $f_{jk}^{t-N}$ and another RGB value of the scrolling texts of the current frame $f_{jk}^{t}$, and if the difference of the two RGB values is greater than the threshold value, the first N frames $f_{jk}^{t-N}$ is interpolated as background to hide the scrolling texts.

11. The method for detecting and removing scrolling texts of claim 10, wherein if the calculation of the RGB value of the relative position point of the first N frames $f_{jk}^{t-N}$ is not yet greater than the threshold value, using the current frame $f_{jk}^{t}$ to conduct bilinear interpolation on the background of the periphery of the scrolling texts to hide the scrolling texts.

* * * * *